United States Patent [19]

Dessau

[11] 4,443,554
[45] Apr. 17, 1984

[54] ACTIVATION OF ALKALI METAL ZEOLITE CATALYSTS BY STEAMING

[75] Inventor: Ralph M. Dessau, Edison, N.J.

[73] Assignee: Mobil Oil Corporation, New York, N.Y.

[21] Appl. No.: 382,863

[22] Filed: May 28, 1982

[51] Int. Cl.³ .................. B01J 29/28; B01J 29/06
[52] U.S. Cl. .................................. 502/71; 502/77; 502/85; 205/120
[58] Field of Search ............ 252/455 Z; 502/71, 77, 502/85; 208/120

[56] References Cited

U.S. PATENT DOCUMENTS

| | | | |
|---|---|---|---|
| 3,257,310 | 6/1966 | Plank | 208/120 |
| 3,391,088 | 7/1968 | Plank et al. | 252/455 Z |
| 3,493,490 | 2/1970 | Planck | 208/120 |
| 3,493,519 | 2/1970 | Kerr | 252/455 |
| 3,758,402 | 9/1973 | Oleck et al. | 208/111 |
| 3,758,403 | 9/1973 | Rosinski | 208/120 |
| 4,149,960 | 4/1979 | Garwood | 208/111 |
| 4,150,062 | 4/1979 | Garwood | 260/673 |
| 4,222,855 | 9/1980 | Pelrine et al. | 208/120 X |
| 4,312,790 | 1/1982 | Butter et al. | 502/64 |
| 4,315,814 | 2/1982 | Shihabi | 208/120 X |
| 4,326,994 | 4/1982 | Haag et al. | 252/455 Z |
| 4,402,866 | 9/1983 | Shihabi | 208/120 X |

FOREIGN PATENT DOCUMENTS 883804  10/1971  Canada ........................ 252/455 Z

*Primary Examiner*—Patrick Garvin
*Assistant Examiner*—Lance Johnson
*Attorney, Agent, or Firm*—Alexander J. McKillop; Michael G. Gilman; L. G. Wise

[57] ABSTRACT

Inactive zeolites such as NaZSM-5 are activated by steaming in the presence of a binder such as alumina.

7 Claims, No Drawings

ACTIVATION OF ALKALI METAL ZEOLITE CATALYSTS BY STEAMING

FIELD OF THE INVENTION

This invention relates to a method for increasing the activity of zeolite catalysts.

THE PRIOR ART

Zeolite catalysts have become widely used in the processing of petroleum and in the production of various petrochemicals. Reactions such as cracking, hydrocracking, alkylation, dealkylation, transalkylation, isomerization and other acid catalyzed reactions may be performed with the aid of these catalysts. Both natural and synthetic zeolites are known to be active in reactions such as these.

Various treatments have been proposed in the past for modifying the activity of zeolites, either by reducing it when too active or by increasing it when insufficient. One such treatment has been steaming and in the past it has generally been used to decrease the activity of the zeolite. The reduction of activity is not, however, necessarily undesirable because it may in certain circumstances be accompanied by an improvement in other characteristics of the zeolite, for example, resistance to aging. This fact has been exploited in certain processes, for example, in the alkylation process described in U.S. Pat. No. 4,016,218 which employs a zeolite catalyst which has been subjected to a prior thermal treatment either in an inert atmosphere or by steaming, to reduce its activity. The deactivation caused by the steam becomes more pronounced at higher temperatures and with longer exposure times.

It has also been found that steaming may in certain instances have beneficial effects on the catalyst, U.S. Pat. No. 3,257,310, for example, describes a method of preparing a cracking catalyst of high activity and selectivity by steaming a zeolite for at least two hours at a specified temperature. U.S. Pat. No. 3,493,519 describes a method of producing hydrothermally stable cracking catalysts by calcining zeolite Y in the presence of steam, a process which was theorized to cause lattice aluminum defects which, after subsequent treatment by base exchange with ammonium salts, chelation and calcination in air produced the desired highly active product. U.S. Pat. No. 3,493,490 describes a method for restoring the activity to used catalyst by controlled treatment with anionic reagents including water at high temperatures, even with catalysts which had initially been steamed to reduce their level of cracking activity, such as zeolites X and Y. U.S. Pat. Nos. 4,149,960, 4,150,062 and 3,758,403 describe processes in which the catalyst properties are said to be favorably affected by the use of water. In these processes the zeolite is generally used in the acidic form or the ammonium exchanged form which is converted to the acidic form on calcination.

U.S. patent application Ser. No. 121,339 (now U.S. Pat. No. 4,326,994) describes a method for enhancing the activity of a zeolite in the acidic form by controlled steaming of the catalyst. The conditions employed for the treatment are related to one another so as to enhance the activity of the catalyst to the desired extent. The acidic zeolites which are treated in this way are members of the ZSM-5 family, such as ZSM-5, ZSM-11, ZSM-12, ZSM-23, ZSM-35 and ZSM-38.

SUMMARY OF THE INVENTION

It has now been found that inactive, non-acidic zeolites may be activated by steaming in the presence of certain binders such as alumina. The inactive zeolites are generally in the alkali metal form, especially the sodium form. The method is particularly useful for zeolites of the ZSM-5 family.

DESCRIPTION OF THE PREFERRED EMBODIMENTS

A number of crystaline zeolites are known and some occur (at least so far) only in nature, for instance paulingite and merlinoite; some occur only as a result of synthesis, for instance zeolites A and ZSM-5; and some occur in both natural and synthetic forms, for instance mordenite, a synthetic counterpart of which is known as Zeolon, and faujasite, synthetic counterparts of which are known as zeolite X and Y. Counterparts are demonstrated as such by correspondence of their X-ray diffraction data, the indicia by means of which the individuality of a zeolite is established. Such data are a manifestation of the particular geometry of the three-dimensional lattice, formed of $SiO_4$ and $AlO_4$ tetrahedra crosslinked by the sharing of oxygen atoms and including sufficient cationic complements to balance the resulting negative charge on the $AlO_4$ tetrahedra, of which a zeolite consists.

The chemical formula of a zeolite is thus

where M is a cation of valence n and x and y are the number of aluminum and silicon atoms, respectively, in the unit cell. This expression is however frequently transmuted into the mole ratio of oxides form

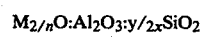

which is of course empirically ascertainable and thus the only formula which can be ascribed to a zeolite when its unit cell contents are unknown. Since the only significant quantity in such a formula is the term y/2x, and since this term (which is almost invariable a range) can usually be satisfied by many zeolites of widely differing lattice geometry, chemical formula is not of value in establishing the identity of a zeolite. Furthermore, such a formula frequently expresses artefact when empirically derived, the cationic-valence/aluminum-atoms ratio deviating from the unity which it must in fact be; and it fails to provide for zeolites whose lattice structure can be brought into existence from reaction mixtures from which alumina is excluded.

The present process may be used with a wide variety of zeolites. The process is, however, especially useful with the zeolites which are characterized by a silica:alumina ratio of at least 12:1 and a Constraint Index of 1 to 12, especially the zeolites of the ZSM-5 family. The Constraint Index of a zeolite provides a measure of the extent to which a zeolite controls the access by molecules of various sizes to its internal structure. Generally, the small pore zeolites which provide highly restricted access, have Constraint Indices above 12. The large pore zeolites, on the other hand usually have Constraint Indices below 1. The zeolites of the ZSM-5 family have Constraint Indices which are usually in the range of 1 to 12. A method for determining Constraint Index is described in U.S. Pat. No. 4,016,218 and J. Catalysis 67, 218-222 (1981), together with values of Constraint Index for typical zeolites, to which reference is made for details of the method. Constraint Index is a structural characteristic of the zeolite but is measured by a test based upon its cracking activity. Cracking activity may, of course, be valued by artifices such as steaming, variation of structural silica:alumina ratio and alkali metal exchange. The Constraint Index determination should therefore be made with a sample which is representative of the structure of the zeolite and which has adequate cracking activity to permit the determination to be made.

The ZSM-5 family of zeolites includes ZSM-5 itself as well as ZSM-11, ZSM-12, ZSM-23, ZSM-35 and ZSM-38.

ZSM-5 is described in U.S. Pat. No. 3,702,886; ZSM-11 in U.S. Pat. No. 3,709,979; ZSM-12 in U.S. Pat. No. 3,832,449; ZSM-23 in U.S. Pat. No. 4,076,842; ZSM-35 in U.S. Pat. No. 4,016,245, ZSM-38 in U.S. Pat. No. 4,046,859; ZSM-20 in U.S. Pat. No. 3,972,983 and zeolite beta in U.S. Pat. Nos. 3,308,069 and Re. 28,341. Highly siliceous forms of ZSM-5 are described in U.S. Pat. No. Re. 29,948, highly siliceous forms of ZSM-11 in U.S. patent application Ser. Nos. 003,143 and 003,145, filed Jan. 15, 1979, highly siliceous forms of ZSM-12 in U.S. patent application Ser. Nos. 003,144 and 003,146, filed Jan. 15, 1979.

The activity of the zeolite has been found to be dependent both on the structural silica:alumina ratio and upon the ionic form of the zeolite. Generally, the alkali metal forms of the zeolite e.g. the Na, K, Cs forms will be inactive. The cracking activity of the zeolite is measured by the conventional n-hexane cracking test which determines the alpha value of the zeolite. The alpha value will be less than or equal to 2 for substantially inactive zeolites. A method for the determination of the alpha value is described in U.S. Pat. No. 4,016,218 and J. Catalysis, Vol. VI, 278-287 (1966) to which reference is made for details of the method.

The degree of activation which may be produced by the present procedure is most noted with zeolites which have structural silica:alumina ratios in the range up to 500. Thus, with the preferred ZSM-5 type zeolites the silica:alumina ratio will be from 12:1 to 500:1 for the greater degree of activation. The degree of activation achieved with the ZSM-5 type zeolites will be marked at silica:alumina ratios from 12:1 to 100:1 e.g. 70:1. The silica:alumina ratios referred to here are structural or framework ratios, that is, the ratios for the $SiO_4$ and $AlO_4$ tetrahedra which together constitute the structure of which the zeolite is composed. This ratio may vary from the silica:alumina ratio determined by various physical and chemical methods. For example, a gross chemical analysis may include aluminum which is present in the form of cations associated with the acidic sites on the zeolite, thereby giving a low silica:alumina ratio. Similarly, if the ratio is determined by thermogravimetric analysis (TGA) of ammonia desorption, a low ammonia titration may be obtained if cationic aluminum prevents exchange of the ammonium ions onto the acidic sites. These disparities are particularly troublesome when certain dealuminization methods which result in the presence of ionic aluminum, free of the zeolite structure, are employed in the preparation of the zeolite.

The inactive zeolite is mixed with alumina which not only confers the desired activation upon steaming but also acts as a binder for the zeolite, improving its mechanical properties. Mixing may be carried out by any convenient procedure such a simple physical mixing, ball-milling or wet mulling. The ratio between the two materials is not critical but will usually be from 10:90 to 90:10 (by weight) and more usually from 20:80 to 80:20.

After mixing is complete, the mixture may be formed into convenient shapes for hardening e.g. by dry pressing or extrusion.

The composite of zeolite and the other material is then steamed in order to bring about the activation. The atmosphere may be wholly or partly of water vapor e.g. from 10 to 100 v/v percent water vapor and if another gas is present it should preferably be an inert gas such as nitrogen. Water precursors such as alcohols, e.g. methanol, ethanol or butanol, which will produce water under the conditions used may also be employed during the steaming. The temperature of the steaming step is not critical but usually it will be from 100° C. to 1000° C., more commonly in the range 300° C. to 800° C. Duration is typically two to twenty four hours but should be chosen in conjunction with the other conditions to procure the activation.

After activation by steaming is complete, the mixture may be composited with a clay or other material in order to give adequate strength for the expected utility. The activated catalysts are useful in reactions such as catalytic dewaxing e.g. as described, for example, in U.S. Pat. Nos. 3,668,113, 3,894,938 and Re. 28,398, in which it has been found that low acidity zeolites, especially alkali metal exchanged zeolites, function in a manner comparable to more highly acidic zeolites but with greater resistance to aging and poisoning.

The invention is illustrated by the following Examples. In the Examples, the relative activity of the zeolites was measured by their hexadecane cracking activity since the conventional alpha test is insufficiently discriminating at the activity levels investigated. In the hexadecane cracking test, n-hexadecane is passed over the test candidate at elevated temperature and pressure in a down-flow trickle bed reactor. The conversion is adjusted to be in the range of 20-60 percent whenever possible in order to maximize accuracy. Hydrogen is fed in with the feed at a 1.3:1 molar ratio hydrogen:hexadecane. An internal standard, 1,4-dimethylnaphthalene which is inert to cracking under the test conditions was also employed (90% n-hexadecane, 10% 1,4-dimethylnaphtalene). The conditions used were as follows:

Temperature, °C.: 350
Pressure, kPa: 2170
Feed rate, ml. hr$^{-1}$: 6
$H_2$:n-$C_{16}H_{34}$ ratio molar: 1.3:1

The results are reported as the percentage conversion of the feed. All percentages are by weight.

EXAMPLE 1

A 2 g. sample of NaZSM-5/$Al_2O_3$ extrudate (zeolite silica:alumina ratio of 70:1) was found to be essentially inactive, having an alpha value for the zeolite of 0.15. In the hexadecane cracking test, the conversion was less than 1 percent.

After steaming the extrudate at 400° C. overnight, the conversion in the hexadecane cracking test was 19.7 percent. After steaming at 500° C., the conversion was 45.4 percent.

EXAMPLE 2

An inactive, binder-free sample of another NaZSM-5 silica:alumina ratio of 70:1) was found to have a hexadecane conversion of less than 1 percent. After steaming this zeolite on its own at 500° C. overnight, the conversion remained below 1 percent.

The zeolite (1.3 g.) was mixed with gamma alumina (0.7 g.) and steamed at 500° C. overnight. The activity in the hexadecane cracking test was found to be 54.8 percent.

EXAMPLE 3

A high pour point crude oil (pour point over 15° C.) is passed over a steamed NaZSM-5/Al$_2$O$_3$ extrudate (65% zeolite, 35% alumina) at 350° C., 1 WHSV in 2170 kPa hydrogen. The dewaxed oil obtained in better than 90% yield is found to have a pour point below −32° C.

I claim:

1. A method for increasing acid cracking activity of alkali metal zeolites having a silica to alumina greater than about 12, a constraint index of about 1 to 12, and an initial α-value less than about 2 which comprises forming a mixture of the alkali metal zeolite with alumina and steaming the mixture at a temperature of at least about 300° C. for at least two hours to increase α-value.

2. A method according to claim 1 in which the zeolite is ZSM-5.

3. A method according to claim 1 in which the zeolite is ZSM-11, ZSM-12, ZSM-23, ZSM-35 or ZSM-38.

4. A method according to claim 1 in which the zeolite is in the sodium form.

5. The method of claim 1 wherein NaZSM-5 is steamed at about 400° C. to 500° C.

6. The method of claim 5 wherein the mixture comprises said zeolite and binder in a weight ratio of about 10:90 to 90:10.

7. A composite catalyst consisting essentially of NaZSM-5 and alumina binder prepared by the method of claim 1.

* * * * *